(12) United States Patent
Liang

(10) Patent No.: US 9,311,534 B2
(45) Date of Patent: Apr. 12, 2016

(54) METHOD AND APPARATUS FOR TRACKING OBJECT

(71) Applicant: Lingyan Liang, Beijing (CN)

(72) Inventor: Lingyan Liang, Beijing (CN)

(73) Assignee: Ricoh Company, LTD., Tokyo (JP)

( * ) Notice: Subject to any disclaimer, the term of this patent is extended or adjusted under 35 U.S.C. 154(b) by 47 days.

(21) Appl. No.: 14/465,784

(22) Filed: Aug. 21, 2014

(65) Prior Publication Data

US 2015/0055829 A1    Feb. 26, 2015

(30) Foreign Application Priority Data

Aug. 23, 2013    (CN) .......................... 2013 1 0373327

(51) Int. Cl.
*G06K 9/46* (2006.01)
*G06T 7/20* (2006.01)
*G06K 9/00* (2006.01)

(52) U.S. Cl.
CPC ........ *G06K 9/00536* (2013.01); *G06K 9/00355* (2013.01); *G06K 9/4642* (2013.01); *G06T 7/204* (2013.01); *G06T 2207/20021* (2013.01); *G06T 2207/30241* (2013.01)

(58) Field of Classification Search
None
See application file for complete search history.

(56) References Cited

U.S. PATENT DOCUMENTS

| 2010/0310127 | A1 | 12/2010 | Ito | |
| 2011/0211754 | A1* | 9/2011 | Litvak | G06K 9/00375 382/165 |

OTHER PUBLICATIONS

Junqiu Wang et al. "Integrating Color and Shape-Texture Features for Adaptive Real-time Object Tracking" Image Processing, IEEE Transactions, vol. 17, Issue 2 (Feb. 2008).
Robert T. Collins et al. "Online Selection of Discriminative Tracking Features" IEEE Transactions on Pattern Analysis and Machine Intelligence, vol. 27, No. 10, pp. 1631-1643 (Oct. 2005).

* cited by examiner

*Primary Examiner* — Bhavesh Mehta
*Assistant Examiner* — Menatoallah Youssef
(74) *Attorney, Agent, or Firm* — Harness, Dickey & Pierce, P.L.C.

(57) ABSTRACT

A method and an apparatus for tracking an object are disclosed. The method includes determining a first position by a first tracking template and determining a second position by a second tracking template, the first and second tracking templates being formed based on first and second feature sets, respectively, the first feature set being different from the second feature set, and the first feature set and the second feature set including one or more features; and determining a final position based on the first position and the second position, wherein the first tracking template is updated for each of a predetermined number of frames, the second tracking template is updated based on a predetermined rule, the second tracking template and the first tracking template are independently updated, and the update frequency of the second tracking template is lower than the first tracking template.

18 Claims, 8 Drawing Sheets

METHOD AND APPARATUS FOR TRACKING OBJECT

BACKGROUND OF THE INVENTION

1. Field of the Invention

The present invention generally relates to image processing, and specifically, a method and an apparatus for tracking an object in the computer vision technology.

2. Description of the Related Art

Currently, the human-computer interaction system is getting a lot of attention, because the operation mode is very easy and convenient for the user. In particular, the hand gesture control system is very convenient for the user. An effective hand gesture recognition system can provide a natural and effective interaction method. In the hand gesture recognition system, the hand tracking is a very important part.

In order to be operated by a user, in a hand tracking system, it is required for the user not to wear any special equipment, such as a special glove, a color marker, etc. Furthermore, the hand is a non-rigid object and has the characteristics of fast movement, easy distortion and self-shielding, therefore the hand tracking technology is a very challenging task.

The U.S. Patent Publication US20100310127A1 discloses an object tracking method. In this patent, there are two different templates for tracking, namely, an initial template and a dynamic template. A tracking result is determined by one or two of an initial template tracking result and a dynamic template tracking result. Meanwhile, a decision-making unit determines whether to update the dynamic template or not. The dynamic template is updated by the initial template and a target image. In this patent, the initial template is never updated, and the dynamic template is updated by the initial template and the target image. Thus, the initial template may be inapplicable to a current environment when the tracking environment changes frequently, therefore such a tracking method is not robust.

In the article published in February 2008 on Image Processing, IEEE Transactions, Volume 17, Issue 2, for which the authors are Junqiu Wang et al., and the title is "Integrating Color and Shape-Texture Features for Adaptive Real-Time Object Tracking", a new target template update method based on an adaptive selection of features is provided. In such a tracking method, the best two features are combined by using a joint histogram. In the article, the feature selection is performed for every 8 to 12 frames. The target template is updated by calculating a similarity between a current template and an initial template. In the article, an alternative update method by considering a relationship among the initial template, a previous template and a current candidate image is provided. In the article, the initial template is a fixed template, is formed by tracking an artificially defined before the start-up or detected object, and never changes during the whole process.

SUMMARY OF THE INVENTION

In the prior art, it is considered that an initial tracking template is reliable and unaffected in the whole tracking process, therefore the initial tracking template is usually used and remains unchanged in the whole tracking process. However, the initial tracking template may develop too much noise when the environment changes frequently, therefore the robustness of the system is reduced.

On the other hand, in order to improve the robustness of a tracking method, it is important to update a tracking template. Currently, there are two conventional template updating methods. The first method is updating the template based on an image of the current tracking result; and this method has a strong environmental compatibility, but noise leading up to a tracking shift is easily introduced. The second method performs a template updating based on a current candidate image and a previous template; and in the updating process of this method, noise leading up to a template shift may be slowly introduced, because of an incomplete classification of an object and a background.

Thus, it is necessary to provide a stable and self-adaptive object tracking method.

According to an aspect of the present invention, a method for tracking an object includes inputting images sequentially; determining a first position of the object in the input image by using a first tracking template and determining a second position of the object in the input image by using a second tracking template, the first tracking template being formed based on a first feature set, the second tracking template being formed based on a second feature set, the first feature set being different from the second feature set, and the first feature set and the second feature set including one or more features; and determining a final position of the object in the input image, based on the first position and the second position, wherein the first tracking template is updated for each of a predetermined number of frames, whereas the second tracking template is updated based on a predetermined rule. The second tracking template and the first tracking template are independently updated, and the update frequency of the second tracking template is lower than the update frequency of the first tracking template.

According to another aspect of the present invention, an apparatus for tracking an object includes an image input unit configured to input images sequentially; a first tracking template position determination unit configured to determine a first position of the object in the input image by using a first tracking template formed based on a first feature set; a second tracking template position determination unit configured to determine a second position of the object in the input image by using a second tracking template formed based on a second feature set, the first feature set being different from the second feature set, and the first feature set and the second feature set including one or more features; an object final position determination unit configured to determine a final position of the object in the input image based on the first position and the second position; a first tracking template update unit configured to update the first tracking template for each of a predetermined number of frames; and a second tracking template update unit configured to update the second tracking template based on a predetermined rule. Wherein the second tracking template and the first tracking template are independently updated and the update frequency of the second tracking template is lower than the update frequency of the first tracking template.

According to the object tracking method and object tracking apparatus, two tracking templates, namely the first tracking template and the second tracking template are used. The first tracking template and the second tracking template are obtained by using different features. Meanwhile, the two tracking templates in the present invention have different update frequencies and are independently updated, and the update frequency of the second tracking template is lower than the update frequency of the first tracking template. In this way, the first tracking template relatively reflects self-adaptability, and the second tracking template relatively considers stability and is updated as necessary. Therefore, the finally formed tracking template can be applied to different environments and can ensure sufficient robustness, and these two can be balanced with each other; therefore, the robustness of the tracking method can be enhanced.

Furthermore, in fact, the success or failure of the tracking mainly depends on how to extract an object from its surrounding background, and a effective division of the object and the background is directly related to the used features. Therefore, in order to obtain optimal features at different times under different backgrounds, it is necessary to select the features in real time; meanwhile, in order to solve the tracking shift, it is necessary to update the tracking template.

For this purpose, in an embodiment, the method and the apparatus for tracking an object further includes dividing the input image into an object region and a background region based on the determined final position of the object in the input image; evaluating abilities of candidate feature sets for distinguishing the object region and the background region by analyzing the object regions and the background regions; determining a first candidate feature set and a second candidate feature set that have the top two strongest distinguishing abilities, respectively; determining whether to update the first feature set by the first candidate feature set, and determining whether to update the second feature set by the second candidate feature set; updating the first feature set and reconstructing the first tracking template based on the updated first feature set and tracking results of a predetermined number of frames immediately before a current frame, if it is determined that the first feature set is updated by the first candidate feature set, otherwise, updating the first tracking template for each of the predetermined number of frames, and not updating the first feature set; and updating the second feature set, and reconstructing the second tracking template based on the updated second feature set and tracking results of a predetermined number of frames immediately before the current frame, if it is determined that the second feature set is updated by the second candidate feature set.

Accordingly, the above method and apparatus perform a selection of the features in real time, therefore the best features can be applied at different times under different environments; and the tracking templates are updated, therefore the robustness of the tracking system can be improved.

BRIEF DESCRIPTION OF THE DRAWINGS

The above aspects and merits and/or other aspects and merits of the present invention will become more apparent from the following detailed description of the embodiments of the present invention when read in conjunction with the accompanying drawings.

DETAILED DESCRIPTION OF THE PREFERRED EMBODIMENTS

In the following, embodiments of the present invention are described in detail with reference to the accompanying drawings, so as to facilitate the understanding of the present invention.

The embodiments will be described in the following order.
1. Example of Application Scene
2. Object Tracking Apparatus
3. First Embodiment of Object Tracking Method
4. Second Embodiment of Object Tracking Method
5. Computation System for Tracking Object In the following description, a hand is described as an example of the tracked object; however, it is just an example, and the tracked object of the present invention is not limited to the hand.

<1. Example of Application Scene>

Figure 1:
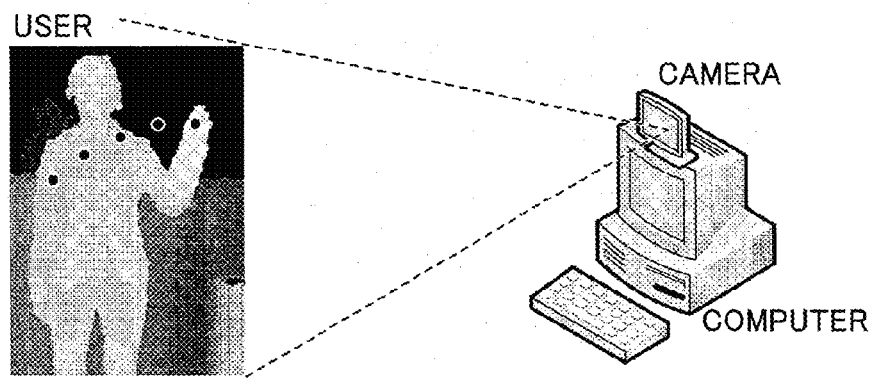
FIG. 1 is a schematic drawing illustrating a hand gesture tracking technology according to an embodiment of the present invention, which is used in a human-computer interaction scene.

FIG. 1 is a schematic drawing illustrating a hand gesture tracking technology according to an embodiment of the present invention, which is used in a human-computer interaction scene. As illustrated in FIG. 1, a camera is provided on a computer, and a user stands within a range of the camera. When the user moves his/her hand in the range of the camera, the computer can calculate real positional information of the hand so as to track the hand in real time. The positions of the hand at different times are illustrated by the points in FIG. 1.

Preferably, the camera, such as a binocular camera can collect a color image and a depth image. The is an image whose values of pixels in the image are the depth. Compared to a grayscale image, a depth image has depth (distance) information of an object, thus the depth image is especially adapted to various applications that require three-dimensional information. Furthermore, there is a simple conversion relationship between a depth value of a pixel and a disparity value of the pixel, therefore the depth information of the present invention has a board meaning, and includes disparity information.

It should be noted that, FIG. 1 is just an example; and the apparatus for tracking a hand is not limited to the computer and may be a game machine, a projector, a television, etc.

<2. Object Tracking Apparatus>

In the following, an example of a configuration of the object tracking apparatus according to the embodiment of the present invention will be described with reference to FIG. 2.

Figure 2:
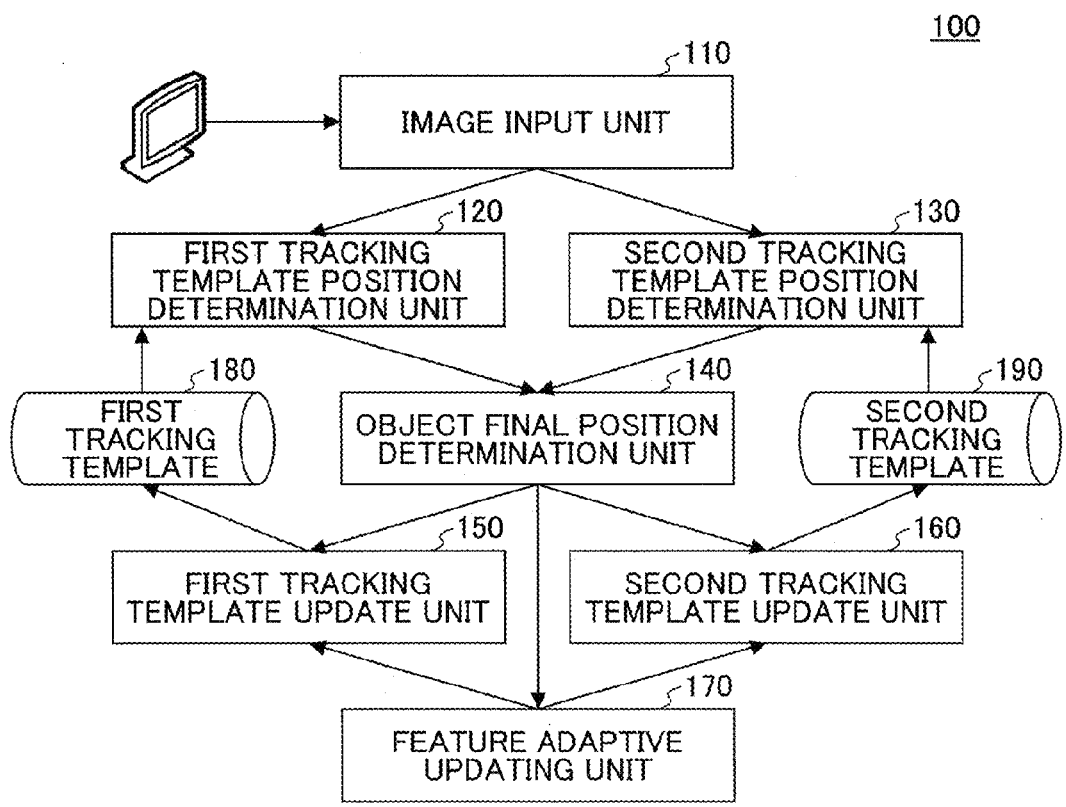
FIG. 2 is a configuration block diagram illustrating an object tracking apparatus 100 according to the embodiment of the present invention.

FIG. 2 is a configuration block diagram illustrating an object tracking apparatus 100 according to the embodiment of the present invention.

As illustrated in FIG. 2, the object tracking apparatus 100 may include: an image input unit 110 configured to input images sequentially; a first tracking template position determination unit 120 configured to determine a first position of the object in the input image, by using a first tracking template 180 formed based on a first feature set; a second tracking template position determination unit 130 configured to determine a second position of the object in the input image, by using a second tracking template 190 formed based on a second feature set, the first feature set being different from the second feature set, and the first feature set and the second feature set including one or more features; an object final position determination unit 140 configured to determine a final position of the object in the input image, based on the first position and the second position; a first tracking template update unit 150 configured to update the first tracking template 180 for each of a predetermined number of frames; and a second tracking template update unit 160 configured to update the second tracking template 190 based on a predetermined rule, wherein the second tracking template 190 and the first tracking template 180 are independently updated, and the update frequency of the second tracking template 190 is lower than the update frequency of the first tracking template 180.

Preferably, the object tracking apparatus 100 may include a feature adaptive updating unit 170. As illustrated in FIG. 2, the feature adaptive updating unit 170 may divide the input image into an object region and a background region, based on the final position of the object in the input image determined by the object final position determination unit 140; evaluate abilities of candidate feature sets for distinguishing the object region and the background region, by analyzing the object regions and the background regions; determine a first candidate feature set and a second candidate feature set that have the top two strongest distinguishing abilities, respectively; determine whether to update the first feature set by the first candidate feature set or not, and determine whether to update the second feature set by the second candidate feature set. The feature adaptive updating unit 170 updates the first feature set and the first tracking template update unit 150 reconstructs the first tracking template based on the updated first feature set, if it is determined that the first feature set is updated by the first candidate feature set; and the feature adaptive updating unit 170 updates the second feature set and the second tracking template update unit 160 reconstructs the second tracking template based on the updated second feature set, if it is determined that the second feature set is updated by the second candidate feature set.

It should be noted that, the above object tracking apparatus 100 may implemented by a software program, for example, a CPU, a RAM, a ROM in a general purpose computer and software codes executed therein. The software program may be stored in a storage medium such as a flash memory, a floppy disk, a hard disk, an optical disk, and be loaded into a random access memory (RAM) and is executed by the CPU when the execution is performed. Besides the general purpose computer, it may also be implemented by an application Specific integrated circuit and software. The integrated circuit is implemented by, for example, one of a MPU (Microprocessor Unit), a DSP (Digital Signal Processor), a FPGA (Field Programmable Gate Array), an ASIC (Application Specific Integrated Circuit). Such a general purpose computer or a dedicated integrated circuit may communicate with imaging equipment such as a camera, so as to perform a color image and/or a stereo image taken by the camera to obtain an object tracking result, and may optionally control the executed application based on the object tracking result. Additionally, each of the units of the object tracking apparatus 100 may be implemented by specialized hardware, such as a FPGA or an ASIC. Additionally, each of the units of the object tracking apparatus 100 may also be implemented by the combination of software and hardware.

It should be noted that, the arrows illustrated in FIG. 2 represent that there is a logical relationship of functions between two units and the operation of two units may be connected directly or indirectly. Furthermore, it does not mean that there is not a logical relationship of functions between two units that are not connected by the arrows illustrated in FIG. 2, and there may be an operational connection relationship between the two units. For example, there may be a logical relationship between the first and second tracking template update unit 150, 160 and the image input unit 110, and the first and second tracking template update unit 150, 160 may use one or more frames of images input by the image input unit 110 in the operation process.

The present invention is not limited to the configuration and number of each of the units in the above object tracking apparatus 100. In an embodiment of the present invention, the above image input unit 110, the first tracking template position determination unit 120, the second tracking template position determination unit 130, the object final position determination unit 140, the first tracking template update unit 150 and the second tracking template update unit 160 may be merged into an independent unit to perform or implement the same functions and operations; or the image input unit 110, the first tracking template position determination unit 120, the second tracking template position determination unit 130, the object final position determination unit 140, the first tracking template update unit 150 and the second tracking template update unit 160 may be divided into smaller units to implement their functions and operations.

Additionally, it should be noted that, the configuration illustrated in FIG. 2 is not exclusive, and the object tracking apparatus 100 may include other units, such as a display unit for displaying a result processed by the object final position determination unit 140, and a communication unit for transmitting related information and/or intermediate processing results to the outside.

<3. First Embodiment of Object Tracking Method>

In the following, an example of functions and operations of each of the units of the object tracking apparatus 100 will be described. As illustrated above, a hand is described as the tracked object.

Figure 3:
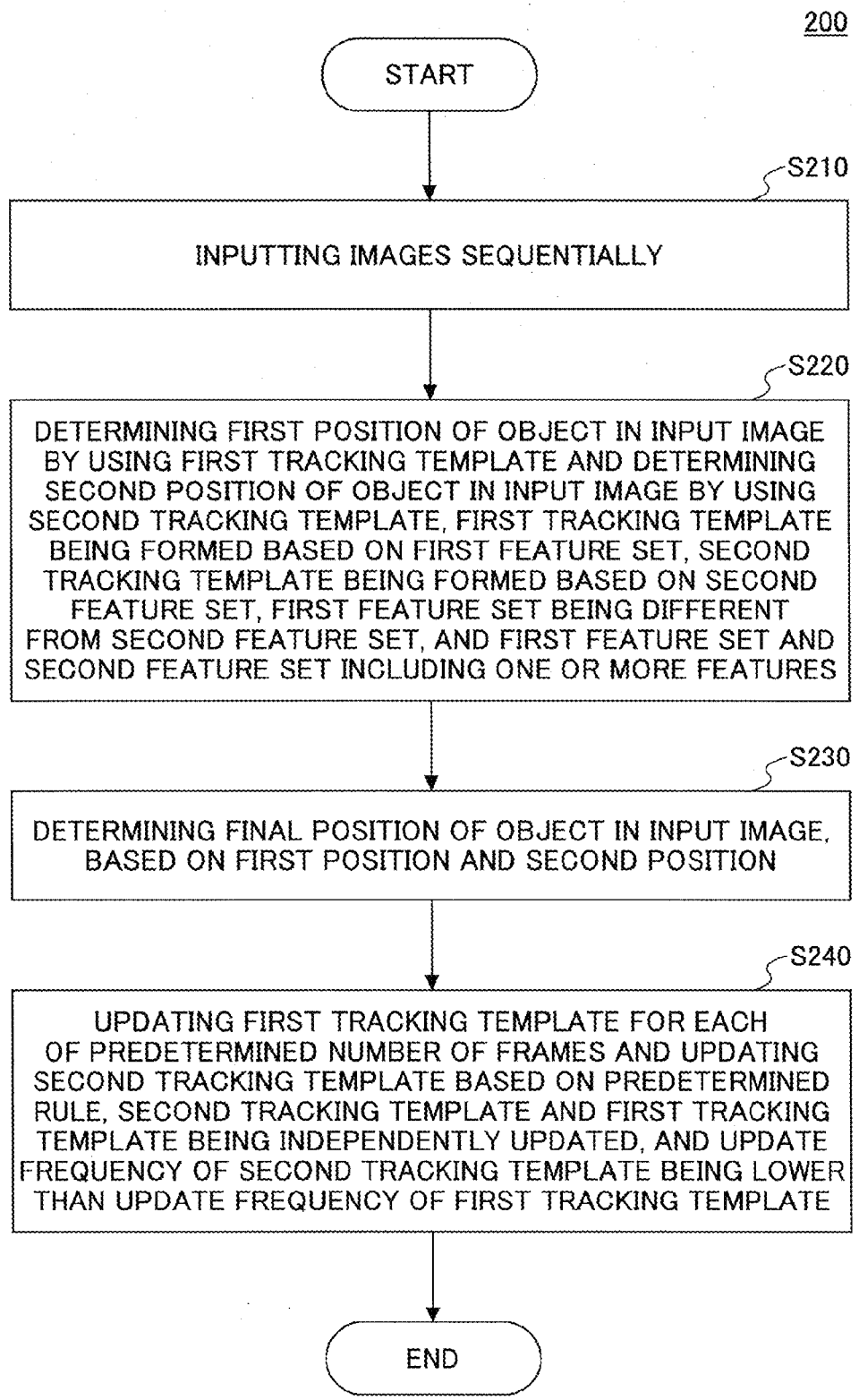
FIG. 3 is an overall flowchart illustrating an object tracking method 200 according to the embodiment of the present invention.

FIG. 3 is an overall flowchart illustrating an object tracking method 200 according to the embodiment of the present invention.

As illustrated in FIG. 3, in step S210, the image input unit 110 inputs images sequentially.

The images may be taken by an ordinary camera, a binocular camera, a multi-view camera or a stereo camera, and be input to the image input unit 110. The image input to the image input unit 110 may include RGB color images only, and may also include RGB color images and depth images.

Alternatively, the image may be directly input from a camera locally, or may also be received from the remote via a wired or wireless network.

In step S220, the first tracking template position determination unit 120 determines a first position of the object in the input image by using a first tracking template, and the second tracking template position determination unit 130 determines a second position of the object in the input image by using a second tracking template. The first tracking template is formed based on a first feature set, the second tracking template is formed based on a second feature set, the first feature set is different from the second feature set, and the first feature set and the second feature set include one or more features.

<3.1 Evaluation of Feature Set and Determination of Tracking Template>

For the determination of the initial first and second tracking template before a start of the tracking, it is necessary to determine corresponding first and second feature sets.

Therefore, a hand region and a surrounding background region may be obtained from one or more images by an automatic detection result of the hand or an artificial definition, namely, a division of an object region and a background region may be performed, so that one or more samples in which the hand region and the background region are defined or divided are obtained. And then, abilities of candidate feature sets for distinguishing the object and the background may be evaluated based on these samples.

FIGS. 4(a) to 4(c) are schematic drawings illustrating a division method for dividing an image into a hand region and a background region, in which positional information of the hand is predetermined and depth information is used in the division process.

First, the hand region and the background region are initially localized, for example, the hand region and the background region corresponding to the hand region are initially divided by a conventional "center surround method". As illustrated in FIG. 4(a), the rectangular frame illustrated by the symbol (hereinafter simply referred to as the "rectangular frame 1") is regarded as a hand region by initially dividing, and the region between the rectangular frame and the rectangular frame illustrated by the symbol 2 (hereinafter simply referred to as the "rectangular frame 2") is regarded as a background region by the division. As illustrated in FIG. 4(a), besides the pixels of the real hand, the rectangular frame 1 also includes a part of pixels of the background region; and some noise will be introduced, if all of the pixels in the rectangular frame 1 are regarded as the foreground pixels of the hand. As illustrated in FIG. 4(b), in order to remove the background noise effectively, the input image of the embodiment includes depth information, and the pixels of the real hand can be obtained based on the depth information. In this way, as illustrated in FIG. 4(c), in the rectangular frame 2, except the pixels of the real hand, all of the pixels are defined as background pixels. The image features that have the strongest abilities for distinguishing the hand pixels and the background pixels can be selected, based on the hand region pixels and the background region pixels defined in FIG. 4(c).

A source feature library may be determined based on the effective features of the hand, and each of the source features, such as color feature, shape feature, outline feature and area feature can distinguish the hand from the background in some situations. Available combinations of the source features form various candidate feature sets. In the process of forming the candidate feature sets, some limitations for reducing the search range may be added in advance to improve the calculation efficiency, for example, the number of elements in the feature set may be limited to 1 or 2, or elements of the feature set may be limited to color features or shape features. In an example, candidate feature sets of interest may be formed in advance, for example, a candidate feature set of color features, a candidate feature set of shape features, a candidate feature set of outline features or a candidate feature set of a combination of features may be formed. The subsequent first and second feature sets are selected from such formed candidate feature sets in advance, therefore the search efficiency can be improved.

In this way, the samples with the hand region and the background region and the candidate feature sets are obtained, thus initial selection of the first feature set and the second feature set can be performed. It should be noted that, the initial first and second feature sets may be determined artificially by the experience, or by automatically evaluating abilities of feature sets for distinguishing the object region and the background region (hereinafter simply referred to as the "distinguishing abilities of features" or the "distinguishing abilities of feature sets"), determining a first candidate feature set and a second candidate feature set that have the top two strongest distinguishing abilities to serve as the first and second feature sets, respectively.

In an example, in the subsequent tracking process, the abilities of the candidate feature sets for distinguishing the object region and the background region may be re-evaluated constantly, and the first and second feature sets may be updated on a predetermined rule.

The method of evaluating the abilities of the feature sets for distinguishing the object region and the background region may be, for example, a chi-square test (CHI), an information gain (IG), a mutual information (MI), a principle component analysis (PCA).

After the first and second feature sets are selected by evaluating the distinguishing abilities, a learning for training samples may be performed based on these features, so as to obtain the first tracking template and the second tracking template. For example, the tracking templates may be formed by calculating mean value and variance of all features based on the training samples.

In the following, a method of determining the first and second feature sets based on a variance ratio of a logarithmic likelihood function that is served as an optimal feature evaluation base, and a method of constructing the tracking template based on a logarithmic likelihood ratio of a histogram distribution of the object and background will be described. The variance ratio of a logarithmic likelihood function that is served as the optimal feature evaluation base may refer to the article published in October 2005 on IEEE transactions on pattern analysis and machine intelligence, vol. 27, no. 10, for which the authors are Robert T. Collins et al., and the title is "Online Selection of Discriminative Tracking Features".

Figure 5:
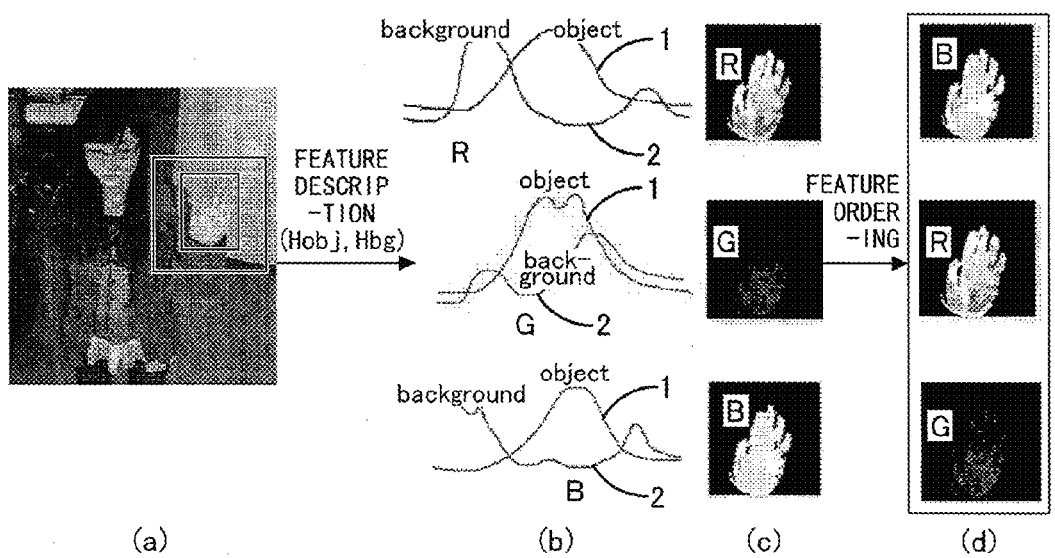
FIGS. 5(a) to 5(d) are schematic drawings illustrating a feature evaluation process.

In the following, it is assumed that there are three types of color features, i.e., R, G and B in the source feature library, and the finally selected feature set only includes one color feature. A method of a feature selection process (that may be used in an online manner in the subsequent tracking process) will be described with reference to FIG. 5.

FIGS. 5(a) to 5(d) are schematic drawings illustrating a feature evaluation process.

Figure 4:
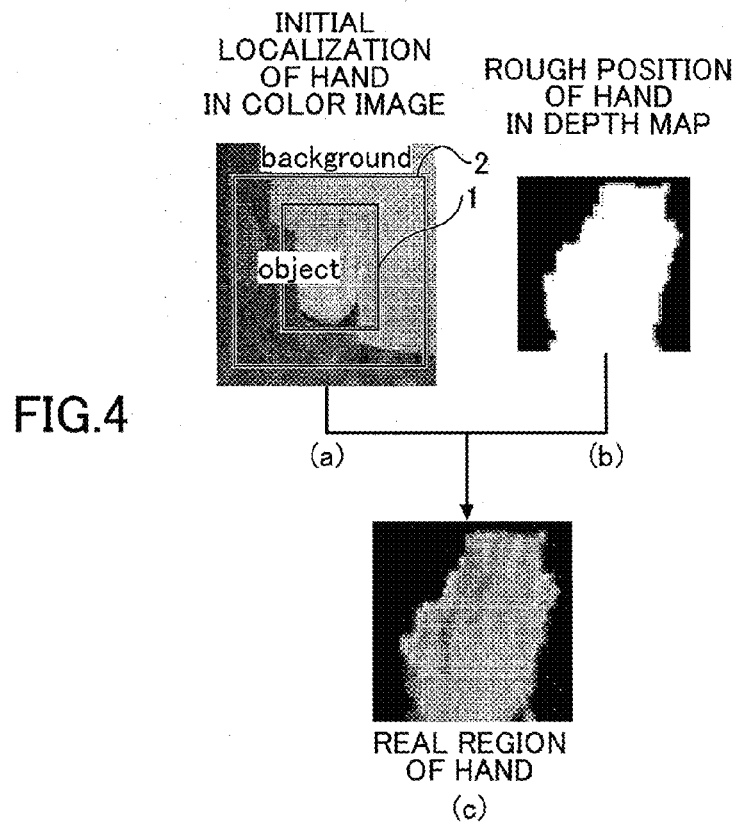
FIGS. 4(a) to 4(c) are schematic drawings illustrating a division method for dividing an image into a hand region and a background region, which position information of the hand is predetermined and depth information is used in the division process.

(1) First, as illustrated in FIG. 5(a), the image is divided into an object pixel region and a background pixel region, and the detailed process is illustrated in FIG. 4.

(2) A feature f is extracted from the source feature library, and histogram distributions of object pixels and background pixels for the feature f are calculated, respectively. In the following, $H_{obj}$ and $H_{bg}$ represent the histogram distributions of the tracked object pixels and the background region pixels for the feature values, respectively. In the example of the object and background pixels in FIG. 5(a), it is assumed that there are three color features R, G and B, and the histogram distributions are calculated. As illustrated in FIG. 5(b), the curve illustrated by the symbol 1 represents the histogram distribution of the object pixels for different feature values, and the curve illustrated by the symbol 2 represents the histogram distribution of the background pixels for different feature values.

(3) The feature with the strongest distinguishing ability is determined by a calculation and scoring of a feature evaluation function. In this example, an evaluation method of a variance ratio is used. Specifically, as illustrated by the following equation (1), a logarithmic likelihood ratio L(i) corresponding to each of the feature values i of the features is calculated; the variance ratio is calculated as illustrated by equation (2); and the feature with the strongest distinguishing ability is determined, based on the variance ratio, and the larger the variance value is, the stronger the distinguishing ability of the feature is.

$$L(i) = \log \frac{\max(H_{obj}(i), \delta)}{\max(H_{bg}(i), \delta)} \quad (1)$$

$$VR(L; H_{obj}, H_{bg}) = \frac{\text{var}(L; (H_{obj} + H_{bg})/2)}{\text{var}(L; H_{obj}) + \text{var}(L; H_{bg})} \quad (2)$$

$$\text{var}(L; H) = \Sigma_i H(i) L^2(i) - [\Sigma_i H(i) L(i)]^2 \quad (3)$$

In equation (1), $H_{obj}(i)$ and $H_{bg}(i)$ represent histogram statistic values of the object and background for the feature whose the feature value is i. For example, $H_{obj}(100)=200$, if the feature value i=100, and the number of the pixels of the tracked object, whose feature values are 100 is 200. Usually, it is necessary to perform a normalization for the histogram statistic values, and the range of the normalization is [0,1]. The normalized $H_{obj}(100)=0.2$, if $H_{obj}(100)=200$ and the total number of the object pixels is 1000. $\delta$ is a very small number for avoiding a divisor of 0, and $\delta$ may be set as 0.0001 or a value smaller than 0.0001.

Equation (2) is used to calculated the variance ratio. Equation (3) is used to calculating var(L,H) illustrated in equation (2).

The intuitive physical significance of the above equation (2) of the variance ratio is to cluster the logarithmic likelihood values of the object pixels and the background pixels (namely, the variance of the same classification is low), and to divide the two clusters (namely, the object and the background) as much as possible (the variance of different classifications is high).

The distinguishing abilities of all source features in the source feature library for the current image is evaluated based on the variance ratio, so as to determine the feature with the strongest distinguishing ability for the current image. As illustrated in FIG. 5(d), as an example of three simple color features, i.e., R, G and B, from the calculation result of the variance ratio, the feature with the strongest distinguishing ability for the object and background in the current image is B, the second one is R, and the last one is G.

In an example, as illustrated in FIGS. 5(c) and 5(d), confidence level images (confidence maps) may be used to represent the distinguishing abilities of different features for the same image. The clearer the confidence level image is, the better the distinguishing ability of the feature is. The effectiveness of the evaluation of the distinguishing abilities of the features based on the variance ratio is verified by the clearness of the generated confidence level images, and the finally ranked result is illustrated in FIG. 5(d).

In this way, two features with the top two strongest distinguishing abilities can be selected as the first and second optimal features, respectively, so as to construct the first and second tracking templates, in cases where there is only one element in the first and second feature sets, namely, the first and second tracking templates are constructed by one feature, respectively.

In a case where the number of the samples is S1 (S1 frames of images), namely, there are S1 histogram distribution sets of the object and background $(H_{obj1}, H_{bg1}), (H_{obj2}, H_{bg2}), \ldots (H_{objS1}, H_{bgS1})$; that is to say, $(H_{obj1}, H_{obj2}, \ldots H_{objS1})$ are histogram distributions of the object pixels in S1 frames for different feature values, and $(H_{bg1}, H_{bg2}, \ldots H_{bgS1})$ are histogram distributions of the background pixels in S1 frames for different feature values. It should be noted that, number of the frames S1 may be one frame. Preferably, in the S1 samples, as the results of the feature evaluation of all samples, the first optimal feature are the features with the strongest distinguishing ability. However, the present invention is not limited to this example, the first optimal features in some samples of the S1 samples may be not the features with the strongest distinguishing ability.

As illustrated in equation (4), the first tracking template may be initially constructed by training and learning, in cases where the first optimal feature which the first tracking template depends on, and the first sample set $(H_{obj1}, H_{bg1}), (H_{obj2}, H_{bg2}), \ldots (H_{objS1}, H_{bgS1})$ are determined. The method of the training and learning may be a support vector machine, or a random forest.

$$T1 = \text{Learning}((H_{obj1}, H_{bg1}), (H_{obj2}, H_{bg2}), \ldots, (H_{objS1}, H_{bgS1}))^{F1} \quad (4)$$

F1 in equation (4) means that the first tracking template T1 is constructed based on the first optimal feature F1.

In an example, the first tracking template T1 is constructed by the following equation (5) similar to equation (1).

$$T1 = \log\left(\frac{\gamma_1 H_{obj1} + \gamma_2 H_{obj2} + \ldots + \gamma_{S1} H_{objS1}}{\rho_1 H_{bg1} + \rho_2 H_{bg2} + \ldots + \rho_{S1} H_{bgS1}}\right) \quad (5)$$

$(\gamma_1, \gamma_2, \ldots \gamma_{S1})$ represent weighting factors corresponding to the histograms of different objects $(H_{obj1}, H_{obj2}, \ldots H_{objS1})$, and $(\rho_1, \rho_2, \ldots \rho_{S1})$ represent weighting factors corresponding to the histograms of different backgrounds $(H_{bg1}, H_{bg2}, \ldots H_{bgS1})$. In an example, it is assumed that each sample in the S1 samples has a similar effect on the formation of the initial tracking template, thus the weighting factors of $(\gamma_1, \gamma_2, \ldots \gamma_{S1})$ and $(\rho_1, \rho_2, \ldots \rho_{S1})$ have the same values and are set as 1/S1.

Similarly, in a case where the number of the samples for constructing the second tracking template is S2 (S2 frames of images), namely, there are S2 histogram distribution sets of the object and background $(H_{obj1}, H_{bg1}), (H_{obj2}, H_{bg2}), \ldots (H_{objS2}, H_{bgS2})$; that is to say, $(H_{obj1}, H_{obj2}, \ldots H_{objS2})$ are histogram distributions of the object pixels in S2 frames for different feature values, and $(H_{bg1}, H_{bg2}, \ldots H_{bgS2})$ are histogram distributions of the background pixels in S2 frames for different feature values. It should be noted that, the number of the frames S2 may be one frame. Preferably, in the S2 samples, as the results of the feature evaluation of all samples, the second optimal features are the features with the second strongest distinguishing ability. However, the present invention is not limited to this example, the second optimal features in some samples of the S2 samples may not be the features with the second strongest distinguishing ability.

Similar to equation (4), as illustrated in equation (6), the second tracking template may be initially constructed by training and learning, based on the second optimal feature F2 and the second sample set S2.

$$T2 = \text{Learning}((H_{obj1}, H_{bg2}), (H_{obj2}, H_{bg2}), \ldots, (H_{objS1}, H_{bgS2}))^{F1} \quad (6)$$

F2 in equation (6) means that the second tracking template T2 is constructed based on the second optimal feature F2.

Specifically, similar to equation (5), in an example, the second tracking template T2 may be constructed by the following equation (7).

$$T2 = \log\left(\frac{\alpha_1 H_{obj1} + \alpha_2 H_{obj2} + \ldots + \alpha_{S1} H_{objS2}}{\beta_1 H_{bg1} + \beta_2 H_{bg2} + \ldots + \beta_{S2} H_{bgS2}}\right) \quad (7)$$

$(\alpha_1, \alpha_2, \ldots \alpha_{S2})$ represent weighting factors corresponding to the histograms of different objects ($H_{obj1}, H_{obj2}, \ldots H_{objS1}$), and $(\beta_1, \beta_2, \ldots \beta_{S2})$ represent weighting factors corresponding to the histograms of different backgrounds ($H_{bg1}, H_{bg2}, \ldots H_{bgS2}$). In an example, it is assumed that each sample in the S2 samples has a similar effect on the formation of the initial tracking template, thus the weighting factors of $(\alpha_1, \alpha_2, \ldots \alpha_{S2})$ and $(\beta_1, \beta_2, \ldots \beta_{S2})$ have the same values and are set as 1/S2.

Furthermore, it should be noted that, the first tracking template and the second tracking template may be constructed based on the same or different (or independent) sample sets. However, the features or feature sets for determining the first tracking template are different from the features or feature sets for determining the second tracking template.

Additionally, it should be noted that, as described above, the first tracking template is based on the first optimal feature (the feature with the strongest distinguishing ability), and the second tracking template is based on the second optimal feature (the feature with the second strongest distinguishing ability). However, it is just an example, and these two may be exchanged with each other; namely, the first tracking template is based on the second optimal feature (the feature with the second strongest distinguishing ability), and the second tracking template is based on the first optimal feature (the feature with the strongest distinguishing ability). Alternatively, the first and second tracking templates might not be based on the features with top two strongest distinguishing abilities, but other features with lower distinguishing abilities as necessary. Generally, the features with a strong distinguishing ability are preferably selected; however, the determination of the strong distinguishing abilities of the features may be based on different evaluation standards, and the rank of the distinguishing abilities of the features may be different. For example, if the color feature has a strong distinguishing ability in some cases and has a very weak distinguishing ability in some cases, and the shape feature does not have a strong distinguishing ability but has a certain distinguishing ability constantly, the shape feature may be regarded as a feature with a distinguishing ability stronger than the color feature in cases where the stability is emphasized.

Furthermore, it should be noted that, the mathematical $H_{obj}$ actually is a multidimensional vector, based on a specific form of the histogram, for example, the number of the available values of the pixel. For example, when a R color feature is selected, and the feature values are 256 values, i.e., 0 to 255, $H_{obj}$ is the number of pixels whose the R value is 0, the number of pixels whose the R value is 1, . . . and the number of pixels whose the R value is 255, i.e., a 256-dimensional vector. Of course, the value range may be set and a statistic may be performed as necessary. For example, the R values are divided into the ranges of [0,7], [8,15], . . . [248,255], and $H_{obj}$ is a 32-dimensional vector in this case. It should be noted that, the calculations of equations (1), (5) and (7) are performed independently for each dimension.

Additionally, it should be noted that, as described above, there is only one feature in each of the feature sets; however, there may also be more than one element in each of the feature sets. As an example of the R, G and B color features described above, two color features are selected to configure the feature set. When the abilities of features for distinguishing the object and background are calculated based on the histogram distributions and the features are selected as described above, the histograms of two features may configure a joint histogram or a two-dimensional histogram, and a similar process is performed. Similarly, the feature set may also be configured by three or more features, and for example, the histograms of three or more features may configure a joint histogram or a corresponding dimensional histogram, and a similar process is performed.

The methods of selecting the first and second feature sets and constructing the initial first and second tracking templates are described above. As described above, it is just an example, and another feature selection method or template construction method may also be applied to the present invention.

<3.2 Localization of Hand>

After the first and second tracking templates are determined, the positions of the object in the input image may be determined or searched by using the first and second tracking template to obtain the first and second position, respectively.

In an example, the step of determining or searching the positions of the object in the input image by using the first and second tracking templates may include predicting a candidate appearance region of the object, and subsequently searching the object in the predicted candidate appearance region.

For example, the candidate appearance region of the object in the input image may be predicted, based on previous motion information of the object, such as speed, acceleration, etc.

Specifically, in a local range, the hand moves approximately at a constant speed; the position where the hand appears in the current image may be calculated based on equations (8) and (9), if the movement speed is used for the prediction. Currently, as the conventional motion prediction method, a Kalman filtering and a particle filtering exist; however, the present embodiment may use any prediction methods.

$$\begin{cases} S_{x,t} = S_{x,t-1} + V_{x,t-1} * \Delta t \\ S_{y,t} = S_{y,t-1} + V_{y,t-1} * \Delta t \end{cases} \quad (8)$$

$$\begin{cases} V_{x,t-1} = \dfrac{(S_{x,t-1} - S_{x,t-2})}{\Delta t} \\ V_{y,t-1} = \dfrac{(S_{y,t-1} - S_{y,t-2})}{\Delta t} \end{cases} \quad (9)$$

In equation (8), $(S_{x,t-1}, S_{y,t-1})$ is the ordinate and abscissa of the position point of the hand in the previous frame (t−1 time), and $(S_{x,t}, S_{y,t})$ is the ordinate and abscissa of the position point in the current frame (t time) where the hand may appear. $\Delta t$ is a time interval between two adjacent frames. Equation (9) illustrates the calculation formula of the movement speed.

In another example, the prediction of the position region further includes a prediction of a depth (or a distance). In this case, equations (8) and (9) turn into the following equations (10) and (11).

$$\begin{cases} S_{x,t} = S_{x,t-1} + V_{x,t-1} * \Delta t \\ S_{y,t} = S_{y,t-1} + V_{y,t-1} * \Delta t \\ S_{z,t} = S_{z,t-1} + V_{z,t-1} * \Delta t \end{cases} \quad (10)$$

$$\begin{cases} V_{x,t-1} = \dfrac{(S_{x,t-1} - S_{x,t-2})}{\Delta t} \\ V_{y,t-1} = \dfrac{(S_{y,t-1} - S_{y,t-2})}{\Delta t} \\ V_{z,t-1} = \dfrac{(S_{z,t-1} - S_{z,t-2})}{\Delta t} \end{cases} \quad (11)$$

Figure 6:
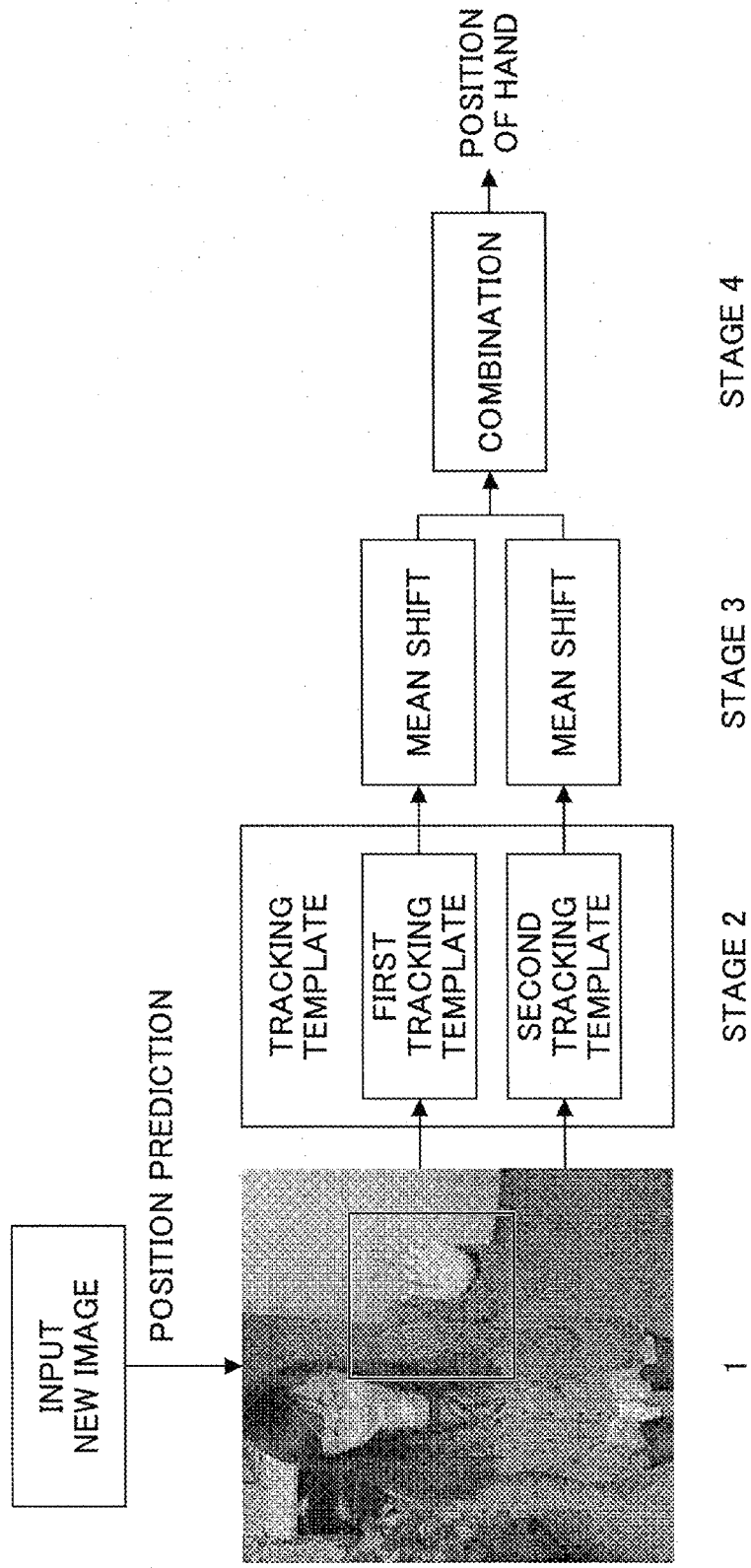
FIG. 6 is a schematic drawing illustrating a process of determining the position of the object based on an input image according to the embodiment of the present invention.

According to the prediction of the candidate region, the processing time can be reduced and the robustness of the system can be enhanced. A conventional kalman prediction method is used in the embodiment of the present invention, and the predicted candidate region is illustrated by the rectangular frame in the image of FIG. 6. FIG. 6 is a schematic drawing illustrating a process of determining the position of the object based on an input image according to the embodiment of the present invention.

And then, in the object candidate region, the positions of the object is determined based on the two different tracking templates, respectively. The object position determination methods may be different based on the different tracking templates. For example, in a conventional object position determination or search method, the object candidate region is scanned by a movable window with a predetermined size, a matching degree (or similarity) between the tracking template and a region where the movable window is located, and the window region with a maximum matching degree (similarity) is served as the searched object region, and the object position is determined.

Figure 7:
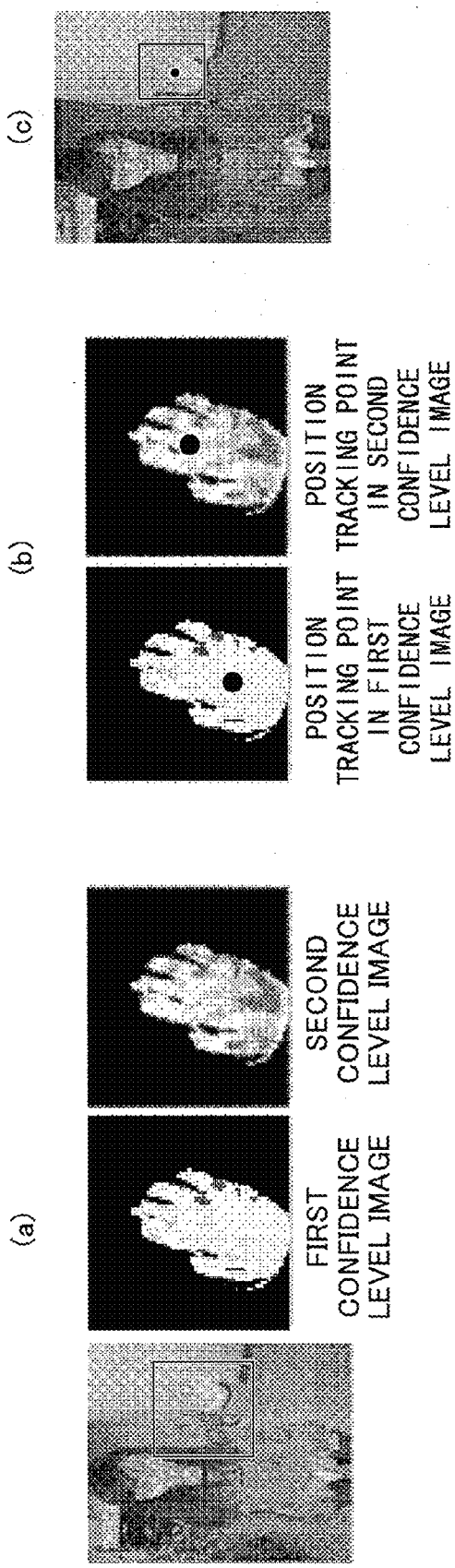
FIGS. 7(a) to 7(c) are schematic drawings illustrating a process of determining the position of the object in the input image based on a first tracking template and a second tracking template.

In an example, as illustrated by stage 2 in FIG. 6, first and second confidence level images (confidence maps) corresponding to the candidate region may be calculated by a backward-projection method based on the first and second tracking templates, respectively. As illustrated by stage 3 in FIG. 6, gravity centers of the confidence level images, i.e., positional tracking points of the hand are calculated by a mean-shift method, for the different confidence level images. The confidence level images calculated by the backward-projection method reflect the matching degree of the pixels corresponding to the current image region to the histogram distribution of the object image; and the higher the matching degree to the histogram distribution of the object image is, the greater the possibilities that the pixels belong to the object pixels are. FIG. 7(*a*) illustrates the first and second confidence level images obtained by calculating the current candidate region (as illustrated by the box in the left drawing) by the first and second tracking templates, respectively. The greater (the brighter) the pixel values in the confidence level image are, the greater the possibilities that the pixels belong to the object pixels are; and the less (the darker) the pixel values in the confidence level image are, the greater the possibilities that the pixels belong to the background are. FIG. 7(*b*) illustrates the gravity center of the first confidence level image (corresponding to the first position of the hand) and the gravity center of the second confidence level image (corresponding to the second position of the hand) calculated by the mean-shift method.

The detailed description of the evaluation of the ability of the feature for distinguishing the object and background based on a logarithmic likelihood ratio and the mean-shift tracking algorithm may refer to the article published in February 2008 on Image Processing, IEEE Transactions, Volume 17, Issue 2, for which the authors are Junqiu Wang et al., and the title is "Integrating Color and Shape-Texture Features for Adaptive Real-Time Object Tracking".

Returning to FIG. 3, the process proceeds to step S230, after the first and second position of the object in the input image are determined based on the first and second tracking templates, respectively, in step S220.

In step S230, a final position of the object in the input image is determined based on the first position and the second position.

As illustrated by stage 4 in FIG. 6, the first position and the second position are combined in this step, and the final position is obtained.

In an example, the first position location$_{first}$ and the second position location$_{second}$ are combined by equation (12), and the final position new location is obtained.

$$\text{new location} = \alpha \times \text{location}_{first} + \beta \times \text{location}_{second} \quad (12)$$

In equation (12), $\alpha$ and $\beta$ represent weighting factors corresponding to the first position location$_{first}$ and the second position location$_{second}$, respectively, where $\alpha, \beta \in [0,1]$ and $\alpha + \beta = 1$. When it is determined that the first position location$_{first}$ and the second position location$_{second}$ are reliable, it may be set as $\alpha = \beta = 0.5$, otherwise the weighting factors may be adjusted in real time. FIG. 7(*c*) illustrates the final position obtained by combining the first position and the second position. The confidence levels of the first position location$_{first}$ and the second position location$_{second}$ may be mainly determined based on the tracking result; and for example, the tracking result may be mainly determined by using prior knowledge, such as shape information (an aspect ratio of the hand), area information, depth information and an average depth of the whole hand region.

After step S230, the process proceeds to step S240.

In step S240, the first tracking template is updated for each of a predetermined number of frames, the second tracking template is updated based on a predetermined rule, the second tracking template and the first tracking template are independently updated, and the update frequency of the second tracking template is lower than the update frequency of the first tracking template.

In order to ensure the adaptability, the first tracking template may be updated for each of a predetermined number of frames, for example, the first tracking template may be updated for each frame, or the first tracking template may also be updated for each of two or more frames in considering a factor such as computational resources and real-time requirements.

Specifically, in an example, the first tracking template may be updated by equation (13).

$$T1_i = \alpha \times T1_{candidate} + (1-\alpha) \times T1_{i-1} \text{ where } i \geq 2 \quad (13)$$

In equation (13), $T1_i$ is the updated first tracking template, $T1_{candidate}$ is a current candidate object, $T1_{i-1}$ is the tracking template used in the precious frame, $\alpha$ is a weight of similarity and the value thereof may be determined by the similarity between $T1_{candidate}$ and $T1_{i-1}$.

The initial first tracking template $T1_1$ may be obtained, for example, by a learning based on the above equation (4).

Furthermore, in order to ensure the robustness of the second tracking template and prevent the fixed second tracking template from not conforming to a changed environment, the second tracking template may be updated based on a predetermined rule, the second tracking template and the first tracking template may be independently updated, and the update frequency of the second tracking template may be lower than the update frequency of the first tracking template.

For example, in an example, the second tracking template may be updated for each of n2 frames, the first tracking template may be updated for each of n1 frames, and n2>n1.

In another example, the confidence level of the tracking result tracked by the second tracking template may be evaluated, and it is determined that the second tracking template is updated if the confidence level is lower than a predetermined threshold.

In another example, as described below, it may be evaluated whether the second feature set for determining the second tracking template is updated, and the second tracking template is updated (or reconstructed) only if the second feature set has been updated.

In spite of updating the second tracking template based on any predetermined rule, the second tracking template and the first tracking template are independently updated, and the update frequency of the second tracking template is lower than the update frequency of the first tracking template.

If it is determined that it is necessary to update the first and second tracking template in step S240, the process may be terminated; and if it is necessary to continue the tracking, the process may return to step S210 and the above process is repeated.

According to the object tracking method of the embodiment of the present invention, two tracking templates, i.e., the first and second tracking templates are combined. The first and second tracking templates are constructed by different feature sets. Furthermore, the update frequencies of the two tracking templates in the embodiment of the present invention are different, the first and second tracking templates is updated independently, and the update frequency of the second tracking template is lower than the update frequency of the first tracking template. In this way, the first tracking template relatively reflects self-adaptability, and can adapt to environment changes, such as illumination changes, shape changes, and background changes; and the second tracking template relatively ensures stability, and is not affected by noises and is updated as necessary. Therefore, the finally formed tracking template can be applied to different environments and can ensure sufficient robustness, and these two can be balanced with each other; accordingly, the robustness of the tracking method can be enhanced.

<4. Second Embodiment of Object Tracking Method>

In the first embodiment, only the templates are updated. In the object tracking method of the second embodiment that will be described below, both templates and features are updated.

Figure 8:
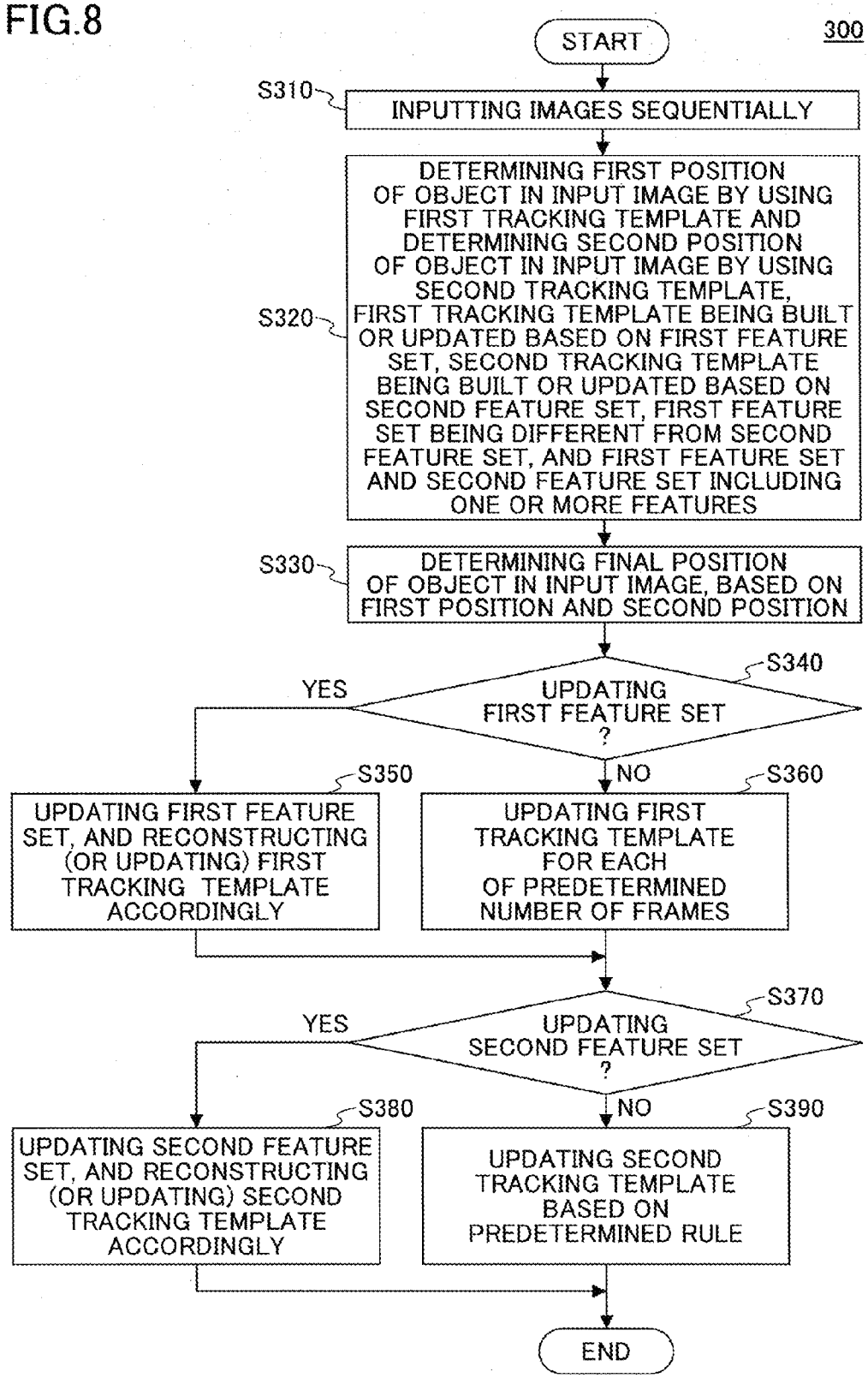
FIG. 8 is an overall flowchart illustrating an object tracking method 300 according to the second embodiment of the present invention.

FIG. 8 is an overall flowchart illustrating an object tracking method 300 according to the second embodiment of the present invention.

The object tracking method 300 of the second embodiment illustrated in FIG. 8 is different from the object tracking method illustrated in FIG. 3 in steps S340 to S390. In the following, steps S340 to S390 are emphatically described, the other steps S310, S320 and S330 are similar to steps S210, S220 and S230 illustrated in FIG. 3, and the descriptions thereof are omitted here.

As illustrated in FIG. 8, in step S340, it is determined whether to update the first feature set.

In an example, determining whether to update the first feature set includes: re-evaluating the abilities of candidate feature sets for distinguishing the object and background regions based on a current tracking result (object position obtained in step S330), performing a feature update if the evaluated strongest feature set is different from the previously used first feature set. In another example, the feature set is updated, only if all of the strongest feature sets re-evaluated in a plurality of adjacent frames are the same and are different from the previously used feature set.

Specifically, in an example, it may be determined whether to update the first feature set by the following steps:

(1) dividing the input image into the object region and the background region, based on the determined final position of the object in the input image;

(2) evaluating abilities of candidate feature sets for distinguishing the object region and the background region, by analyzing the object region and the background region;

(3) determining a first candidate feature set with the strongest distinguishing ability;

(4) saving the first candidate feature set with the strongest distinguishing ability and saving the current image as a candidate sample, if the determined first candidate feature set with the strongest distinguishing ability is different from the currently used first feature set; and considering the currently used first feature set is unsuited to the current tracking environment and determining to update the first feature set if all of the candidate feature sets with the strongest distinguishing ability evaluated in the subsequent continuous m1 frames are the first candidate feature set, otherwise, determining not to update the first feature set. m1 is a positive integer, and the size thereof may be artificially set or determined by learning.

If it is determined that the first feature set is updated in step S340, the process proceeds to step S350.

In step S350, the current first feature set is replaced by the first candidate feature set, and the first tracking template is reconstructed accordingly. In the present specification, the "update" may be interpreted broadly, and the "reconstruct" may be regarded as one of the "update".

In the method of reconstructing the first tracking template, since the first feature set and the sample set (consisting of candidate samples) exist, in an example, the first tracking template may be reconstructed by the method of constructing the initial first tracking template (for example, see the above equations (4) and (5)).

After step S350 is completed, the process proceeds to step S370.

On the other hand, the process proceeds to step S360, if it is determined that it is unnecessary to update the first feature set in step S340.

In step S360, similarly to step S240 in FIG. 3, the first tracking template is updated for each of a predetermined frames. It should be noted that, the counted number of frames may be reset, if the update of the first feature set and the update of the first tracking template have been performed.

Next, in step S370, it is determined whether to update the second feature set. Similarly to step S340, in an example, it may be determined whether to update the second feature set by the following steps:

(1) dividing the input image into the object region and the background region, based on the determined final position of the object in the input image;

(2) evaluating abilities of candidate feature sets for distinguishing the object region and the background region, by analyzing the object region and the background region;

(3) determining a second candidate feature set with the second strongest distinguishing ability;

(4) saving the second candidate feature set with the second strongest distinguishing ability and saving the current image as a candidate sample, if the determined second candidate feature set with the second strongest distinguishing ability is different from the currently used second feature set; and considering the currently used second feature set is unsuited to the current tracking environment and determining to update the second feature set if all of the candidate feature sets with the second strongest distinguishing ability evaluated in the subsequent continuous m2 frames are the second candidate feature set, otherwise, determining not to update the second feature set. m2 is a positive integer, and the size thereof may be artificially set or determined by learning.

It should be noted that, in step S370 and step S340, the first feature set is replaced by the feature set with the strongest distinguishing ability, and the second feature set is replaced by the feature set with the second strongest distinguishing ability. However, it is just an example, the rules of the replacement may be different, based on the rules of the initial selection of the first and second feature sets.

If it is determined that the second feature set is updated in step S370, the process proceeds to step S380.

In step S380, the current second feature set is replaced by the second candidate feature set, and the second tracking template is reconstructed accordingly. In the present specification, the "update" may be interpreted broadly, and the "reconstruct" may be regarded as one of the "update".

In the method of reconstructing the second tracking template, since the second feature set and the sample set (consisting of candidate samples) exist, in an example, the second tracking template may be reconstructed by the method of constructing the initial second tracking template (for example, see the above equations (6) and (7)).

The process proceeds to step S390, if it is determined that it is unnecessary to update the second feature set in step S370.

In step S390, similarly to step S240 in FIG. 3, the second tracking template is updated based on a predetermined rule. For example, in an example as described above, the second tracking template may be updated for each of n2 frames, and it is assumed that the first tracking template is updated for each of n1 frames, and n2>n1. In another example, the confidence level of the tracking result tracked by the second tracking template may be evaluated, and it is determined that the second tracking template is updated if the confidence level is lower than a predetermined threshold.

If the predetermined rule is that the second tracking template is updated (or reconstructed) based on the updated second feature set only when the second feature set has been updated, the steps S380 and S390 may be merged into one step, namely, no process is performed in step S390, since the second tracking template has been reconstructed (updated) in step S380.

After steps S380 and S390, the process is completed. Alternatively, the process may return to S310 to repeat the above processes if it is necessary to continue to track the object.

Figure 9:
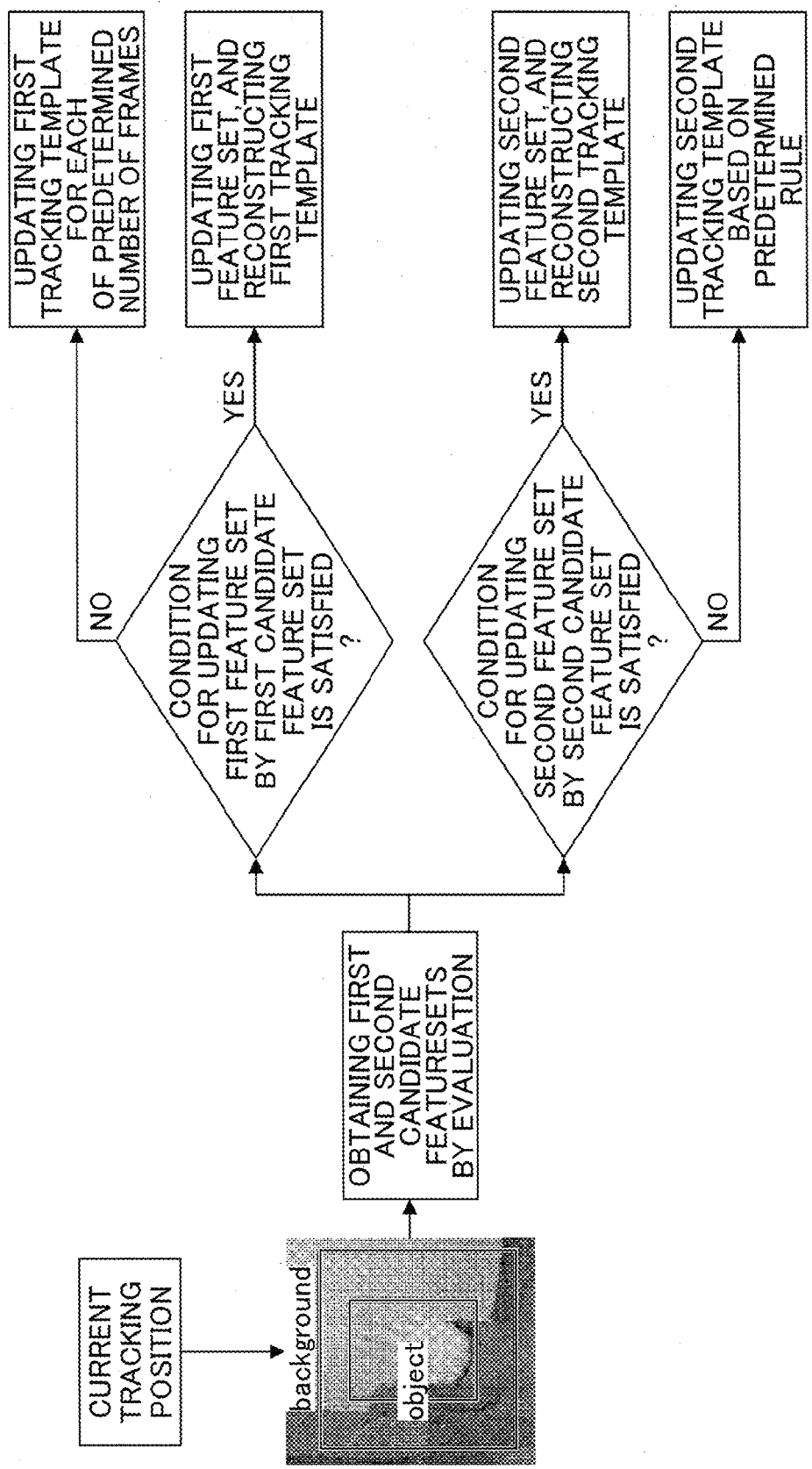
FIG. 9 is a schematic drawing illustrating an object tracking method according to the third embodiment of the present invention from another perspective.

FIG. 9 is a schematic drawing illustrating an object tracking method according to the third embodiment of the present invention from another perspective. As illustrated in FIG. 9, at the current tracking position, a division result of the object and background region illustrated by the rectangular frame in the image is obtained, and then the first and second candidate feature sets are obtained by evaluating the abilities of the candidate feature sets for distinguishing the object and background region; it is determined whether the condition for updating the first feature set by the first candidate feature set is satisfied, and the first feature set is updated and the first tracking template is reconstructed if the condition is satisfied, otherwise the first tracking template is updated for each of the predetermined frames; and similarly, it is determined whether the condition for updating the second feature set by the second candidate feature set is satisfied, and the second feature set is updated and the second tracking template is reconstructed if the condition is satisfied, otherwise the second tracking template is updated based on the predetermined rule (including not updating the second tracking template).

Accordingly, the above method performs a selection of the features in real time, therefore the best features can be applied at different times under different environments; and the tracking templates are updated, therefore the robustness of the tracking system can be improved.

<5. Computation System for Tracking Object>

Figure 10:
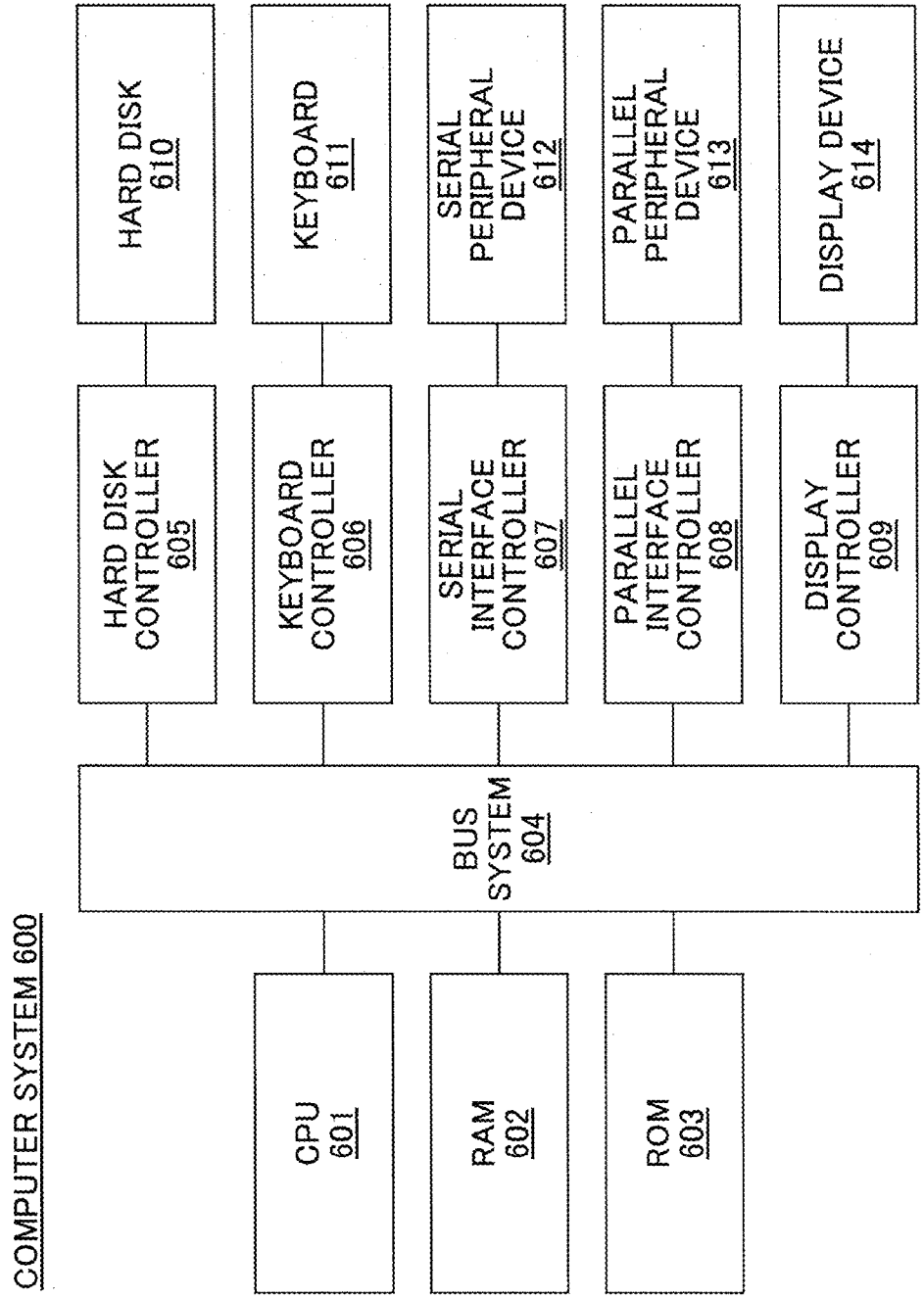
FIG. 10 is a block diagram illustrating a computation system 600 for implementing the embodiment of the present invention.

The present invention may also be implemented as a computation system for tracking an object. FIG. 10 is a block diagram illustrating a computation system 600 for implementing the embodiment of the present invention. As illustrated in FIG. 10, the computation system (computer system) 600 may include a CPU 601, a RAM (Random Access Memory) 602, a ROM (Read-Only Memory) 603, a system bus (bus system) 604, a hard disk controller 605, a keyboard controller 606, a serial interface controller 607, a parallel interface controller 608, a display controller 609, a hard disk 610, a keyboard 611, a serial peripheral device 612, a parallel peripheral device 613 and a display device 614. In these devices, the system bus 604 is coupled to the CPU 601, the RAM 602, the ROM 603, the hard disk controller 605, the keyboard controller 606, the serial interface controller 607, the parallel interface controller 608 and the display controller 609. The hard disk 610 is coupled to the hard disk controller 605, the keyboard 611 is coupled to the keyboard controller 606, the serial peripheral device 612 is coupled to the serial interface controller 607, the parallel peripheral device 613 is coupled to the parallel interface controller 608, and the display device 614 is coupled to the display controller 609. It should be noted that, the configuration block diagram of FIG. 10 is only for the description, and the present invention is not limited to this diagram. In some cases, some devices may be added or removed as necessary.

The present invention may be implemented as a system, an apparatus, a method or a computer program product. Therefore, the present invention may be specifically implemented as hardware, software (including firmware, resident software, micro-code, etc.) a combination of hardware and software, which is referred to as "circuit", "module", "apparatus" or "system". Additionally, the present invention may also be implemented as a computer program product in one or more computer-readable media, and the computer-readable media includes computer-readable computer codes.

Any combinations of one or more computer-readable media may be used. The computer-readable medium may be a computer-readable signal medium or a computer-readable storage medium. The computer-readable storage medium may be, for example, a system, apparatus or an element of electric, magnetic, optic, electromagnetic, infrared or semiconductor, or a combination of any of the above, but is not limited to them. Specifically, the computer-readable storage medium may include a single electrical connection having a plurality of wires, a portable computer disk, a hard disk, a random access memory (RAM), a read-only memory, an erasable programmable read-only memory (an EPROM or a Flash memory), an optical fiber, a portable compact disc read-only memory (CD-ROM), an optical memory device, a magnetic storage device, or a suitable combination of any of the above. In the present specification, the computer-readable storage medium may include tangible medium including or storing a program, and the program may be used by an instruction execution system, apparatus, device or a combination thereof.

The computer-readable signal medium may include data signals to be propagated as a part of a carrier wave, where computer-readable program codes are loaded. The propagated data signals may be electromagnetic signals, optical signals or a suitable combination thereof, but is not limited to these signals. The computer-readable medium may also be any computer-readable medium except the computer-readable storage medium, the computer-readable medium may send, propagate or transmit a program used by an instruction execution system, apparatus, device or a combination thereof.

The program codes included in the computer-readable medium may be transmitted by any media, such as wireless, wire, optical cable, RF or any combinations thereof.

The computer program codes for executing the operation of the present invention may be edited by one or more programming languages or a combination thereof. The programming languages include an object-oriented language such as JAVA, Smalltalk, C++, and a procedural programming language such as C or similar programming languages. The program codes may be executed on a user's computer completely or partly, be executed as an independent software package, be executed on a user's computer partly and a remote computer partly, or be executed on a remote computer or server completely. The remote computer may be connected to the user's computer via any networks such as a local area network (LAN) or a wide area network (WAN), or may be connected to an external computer (for example by an internet provided by an internet service provider).

The present invention is described with reference to the flowcharts and/or block diagrams of the method, apparatus (system) and computer program products according to the embodiments of the present invention. It should be noted that, each block and a combination of the blocks in the flowcharts and/or the block diagrams may be implemented by computer program instructions. The computer program instructions may be provided to a processor of a general-purpose computer, a special purpose computer or other programmable data processing apparatus, and the computer program instructions are executed by the computer or other programmable data processing apparatus to implement functions/operations in the flowcharts and/or the block diagrams.

The computer program instructions may also be stored in the computer-readable medium for making the computer or other programmable data processing apparatus operate in a specific manner, and the instructions stored in the computer-readable medium may generate an instruction means for implementing the functions/operations in the flowcharts and/or the block diagrams.

The computer program codes may also be loaded on the computer, other programmable data processing apparatus or other device, so as to execute a series of operation steps in the computer, other programmable data processing apparatus or other device, so that the instructions executed in the computer or other programmable apparatus can provide a process for implementing the functions/operations in the flowcharts and/or block diagrams.

The above description is just for explanation, and modifications and/or replacement may be performed.

For example, as described above, the tracking object is a hand; however, it is just an example, and the tracking object may be a human face, a whole body of a human, a movable object, etc.

In addition, as described above, the color feature is used in the feature evaluation, the feature selection and the template construction, but it is just an example. In actuality, the feature is not limited, and the shape feature, the outline feature and the area feature may be used.

As described above, the variance ratio is used to evaluate the abilities of the features for distinguishing the object and background; however, the feature evaluation may also use other methods, such as chi-square test (CHI), information gain (IG), mutual information (MI), principal component analysis (PCA), etc.

Furthermore, as described above, the object localization method (object position determination method) obtains the confidence levels by the backward-projection, and determines the position of the object by a mean-shift method. However, the present invention may also use other object localization method, such as Euclidean distance calculation or other similarity calculation methods.

The available system structure, functions and operations of the system, method and computer program product according to the present invention are illustrated by the flowcharts and block diagrams in the drawings. Each of the blocks in the flowcharts or block diagrams represent a module, program segment or a part of codes, and the module, program segment or the part of codes include one or more executable instructions for implementing logic functions. It should be noted that, in the apparatus or method of the present invention, units or steps may be divided and/or recombined. The division and/or recombination should be regarded as an equivalent embodiment of the present invention. Steps of the above method may be performed in time order, however the performed sequence is not limited to the time order. Any steps may be performed in parallel or independently.

The present invention is not limited to the specifically disclosed embodiments, and various modifications, combinations and replacements may be made without departing from the scope of the present invention.

The present application is based on and claims the benefit of priority of Chinese Priority Application No. 201310373327.9 filed on Aug. 23, 2013, the entire contents of which are hereby incorporated by reference.

What is claimed is:

1. A method for tracking an object, the method comprising the steps of:
   inputting images sequentially;
   determining a first position of the object in the input image by using a first tracking template and determining a second position of the object in the input image by using a second tracking template, the first tracking template being formed based on a first feature set, the second tracking template being formed based on a second feature set, the first feature set being different from the second feature set, and the first feature set and the second feature set including one or more features; and
   determining a final position of the object in the input image, based on the first position and the second position,
   wherein the first tracking template is updated for each of a predetermined number of frames, the second tracking template is updated based on a predetermined rule, the second tracking template and the first tracking template are independently updated, and the update frequency of the second tracking template is lower than the update frequency of the first tracking template.

2. The method for tracking an object according to claim 1, further comprising:
   dividing the input image into an object region and a background region, based on the determined final position of the object in the input image;
   evaluating abilities of candidate feature sets for distinguishing the object region and the background region, by analyzing the object regions and the background regions;
   determining a first candidate feature set and a second candidate feature set that have the top two strongest distinguishing abilities, respectively;

determining whether to update the first feature set by the first candidate feature set, and determining whether to update the second feature set by the second candidate feature set;

updating the first feature set, and reconstructing the first tracking template based on the updated first feature set and tracking results of a predetermined number of frames immediately before a current frame, if it is determined that the first feature set is updated by the first candidate feature set, otherwise, updating the first tracking template for each of the predetermined number of frames, and not updating the first feature set; and updating the second feature set, and reconstructing the second tracking template based on the updated second feature set and tracking results of a predetermined number of frames immediately before the current frame, if it is determined that the second feature set is updated by the second candidate feature set.

3. The method for tracking an object according to claim 1, wherein the step of determining the first position of the object in the input image by using the first tracking template and determining the second position of the object in the input image by using the second tracking template includes predicting a candidate appearance region of the object in the input image, based on motion information of the object, and determining the first position of the object in the input image by using the first tracking template and determining the second position of the object in the input image by using the second tracking template, in the candidate appearance region.

4. The method for tracking an object according to claim 1, wherein the first tracking template is updated for the input image of each frame.

5. The method for tracking an object according to claim 1, wherein the step of determining the first position of the object in the input image by using the first tracking template and determining the second position of the object in the input image by using the second tracking template includes calculating a first confidence level image and a second confidence level image corresponding to a candidate region of the object in the input image, based on the first tracking template and the second tracking template, respectively, and obtaining by a mean-shift method, based on the first confidence level image and the second confidence level image, a first position of the object in the first confidence level image and a second position of the object in the second confidence level image, to serve as the first position of the object in the input image and the second position of the object in the input image, respectively.

6. The method for tracking an object according to claim 1, wherein the step of determining the final position of the object in the input image based on the first position and the second position includes determining a confidence level of the first position and a confidence level of the second position, respectively, determining a weight of the first position and a weight of the second position based on the confidence level of the first position and the confidence level of the second position, and calculating, based on the weight of the first position and the weight of the second position, a weighted sum of the first position and the second position, to serve as the final position of the object in the input image.

7. The method for tracking an object according to claim 1, wherein the updated first tracking template is obtained based on a weighted sum of a current tracking template and the currently tracked object, when the first tracking template is updated for each of a predetermined number of frames.

8. The method for tracking an object according to claim 2, wherein each of the candidate feature sets consists of one independent feature or a combination of a plurality of features, and the step of evaluating abilities of the candidate feature sets for distinguishing the object region and the background region by analyzing the object regions and the background regions includes calculating a histogram distribution of pixels in the object region and the background region for each of the candidate feature sets, respectively, and evaluating by a feature evaluation function, the abilities of the candidate feature sets for distinguishing the object region and the background region.

9. The method for tracking an object according to claim 2, wherein the input image includes depth information, and the step of dividing the input image into the object region and the background region based on the determined final position of the object in the input image includes dividing the input image into the object region and the background region based on the depth information.

10. An apparatus for tracking an object, the apparatus comprising:

an image input unit configured to input images sequentially;

a first tracking template position determination unit configured to determine a first position of the object in the input image, by using a first tracking template formed based on a first feature set;

a second tracking template position determination unit configured to determine a second position of the object in the input image, by using a second tracking template formed based on a second feature set, the first feature set being different from the second feature set, and the first feature set and the second feature set including one or more features;

an object final position determination unit configured to determine a final position of the object in the input image, based on the first position and the second position;

a first tracking template update unit configured to update the first tracking template for each of a predetermined number of frames; and a second tracking template update unit configured to update the second tracking template based on a predetermined rule, wherein the second tracking template and the first tracking template are independently updated, and the update frequency of the second tracking template is lower than the update frequency of the first tracking template.

11. The apparatus for tracking an object according to claim 10, further comprising:

a division unit configured to divide the input image into an object region and a background region, based on the determined final position of the object in the input image;

an evaluation unit configured to evaluate abilities of candidate feature sets for distinguishing the object region and the background region, by analyzing the object regions and the background regions;

a candidate feature set determination unit configured to determine a first candidate feature set and a second candidate feature set that have the top two strongest distinguishing abilities, respectively;

a determination unit configured to determine whether to update the first feature set by the first candidate feature set, and determine whether to update the second feature set by the second candidate feature set;

a first update unit configured to update the first feature set, and reconstruct the first tracking template based on the updated first feature set and tracking results of a predetermined number of frames immediately before a current frame, if it is determined that the first feature set is updated by the first candidate feature set, otherwise, update the first tracking template for each of the predetermined number of frames, and not update the first feature set; and a second update unit configured to update the second feature set, and reconstruct the second tracking template based on the updated second feature set and tracking results of a predetermined number of frames immediately before the current frame, if it is determined that the second feature set is updated by the second candidate feature set.

12. The apparatus for tracking an object according to claim 10, wherein, the first tracking template position determination unit determines the first position of the object in the input image by using the first tracking template, in a candidate appearance region, and the second tracking template position determination unit determines the second position of the object in the input image by using the second tracking template, in the candidate appearance region, wherein the candidate appearance region of the object in the input image is predicted, based on motion information of the object.

13. The apparatus for tracking an object according to claim 10, wherein the first tracking template update unit updates the first tracking template for the input image of each frame.

14. The apparatus for tracking an object according to claim 10, wherein, the first tracking template position determination unit obtains by a mean-shift method, based on a first confidence level image, a first position of the object in the first confidence level image, to serve as the first position of the object in the input image, and the second tracking template position determination unit obtains by a mean-shift method, based on a second confidence level image, a second position of the object in the second confidence level image, to serve as the second position of the object in the input image, wherein the first confidence level image and the second confidence level image corresponding to a candidate region of the object in the input image are calculated, based on the first tracking template and the second tracking template, respectively.

15. The apparatus for tracking an object according to claim 10, wherein the object final position determination unit determines a confidence level of the first position and a confidence level of the second position, respectively, determines a weight of the first position and a weight of the second position based on the confidence level of the first position and the confidence level of the second position, and calculates, based on the weight of the first position and the weight of the second position, a weighted sum of the first position and the second position, to serve as the final position of the object in the input image.

16. The apparatus for tracking an object according to claim 10, wherein the first tracking template update unit obtains the updated first tracking template, based on a weighted sum of a current tracking template and the currently tracked object.

17. The apparatus for tracking an object according to claim 11, wherein each of the candidate feature sets consists of one independent feature or a combination of a plurality of features, and the evaluation unit calculates a histogram distribution of pixels in the object region and the background region for each of the candidate feature sets, respectively, and evaluates by a feature evaluation function, the abilities of the candidate feature sets for distinguishing the object region and the background region.

18. The apparatus for tracking an object according to claim 11, wherein the input image includes depth information, and the division unit divides the input image into the object region and the background region based on the depth information.

* * * * *